(No Model.)
G. BUKOFSKY.
HARROW.
No. 583,730. Patented June 1, 1897.
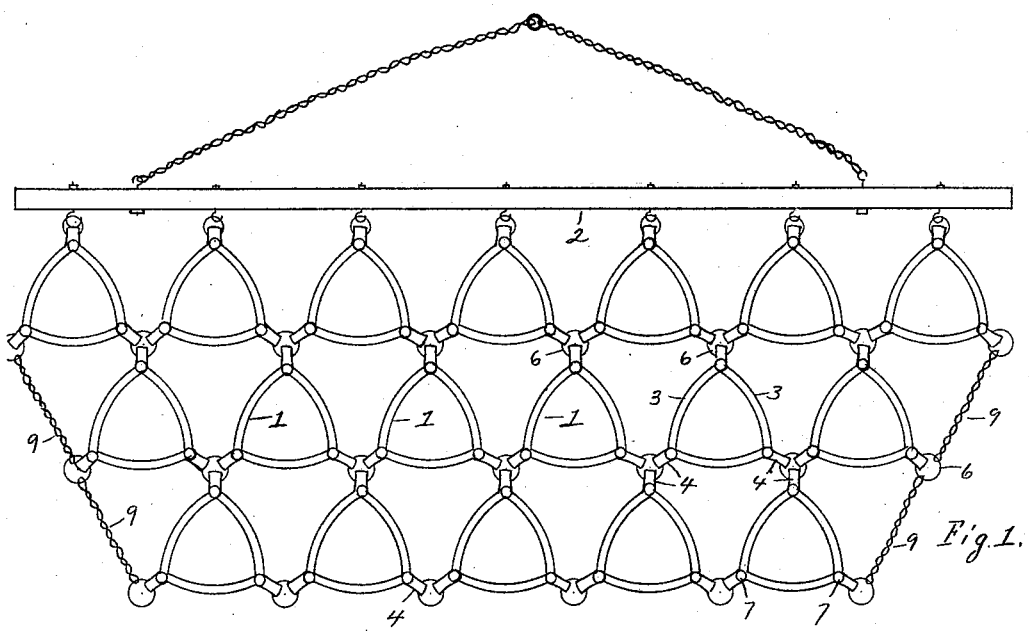
Fig. 1.
Fig. 3.
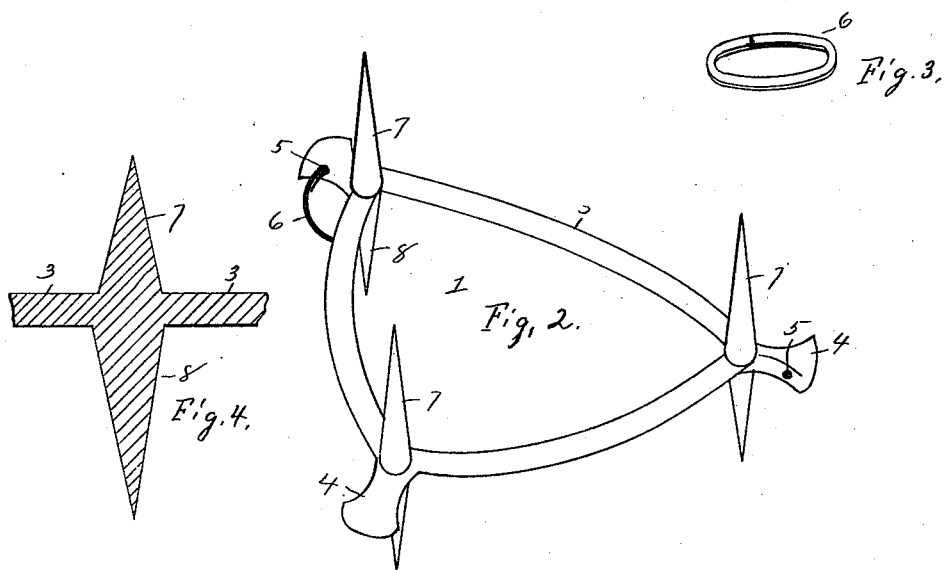
Fig. 2.
Fig. 4.
Witnesses
Adolf J. Weiner
Ludwig Zeisler
Inventor
Geo. Bukofsky
By Glascock & Co.
Attorneys

UNITED STATES PATENT OFFICE.

GEORGE BUKOFSKY, OF CHICAGO, ILLINOIS.

HARROW.

SPECIFICATION forming part of Letters Patent No. 583,730, dated June 1, 1897.

Application filed September 15, 1896. Serial No. 605,938. (No model.)

*To all whom it may concern:*

Be it known that I, GEORGE BUKOFSKY, a citizen of the United States, residing at Chicago, in the county of Cook and State of Illinois, have invented a certain new, useful, and valuable Improvement in Harrows, of which the following is a full, clear, and exact description.

My invention has relation to harrows; and it consists in the novel construction and arrangement of its parts, as hereinafter described.

In the accompanying drawings, Figure 1 is a top plan view of the harrow. Fig. 2 is a perspective view of one of the sections of the harrow. Fig. 3 is a perspective view of a split link used to connect the sections. Fig. 4 is a sectional view through the teeth and adjoining parts of the section.

The harrow is composed of a number of trihedral sections 1. The sections at the front of the harrow are connected to the cross-bar 2 by any suitable means.

The sections 1 are made in one casting complete. The sides 3 of the sections are preferably curved, as shown. At the apexes of the angles the protrusions 4 are formed. Each said protrusion is provided with a lateral perforation 5. The triangular sections are secured together by the split rings 6, which are passed through the perforations 5 and secure the sections together, as shown in Fig. 1.

At the apexes of the angles and extending perpendicularly on each side of the section the teeth 7 and 8 are formed. Said teeth are cast solid with the body of the section, and hence cannot be detached from the same. The teeth on one side of the section are longer than the teeth on the opposite side.

Any number of sections may be connected together to form the harrow, and the free ends of the sections may be secured together by the chains 9 9.

When the harrow is not in use, the sections may be folded or rolled up without disconnecting them from each other, and thus the harrow will be put in compact form for transportation or storage.

When it is desired to harrow the ground lightly, the short teeth are used, and when it is desired to harrow the ground heavier the harrow is simply turned over and it is ready for operation. The teeth cannot be worked loose from the sections. Hence they will not be lost or otherwise misplaced.

Having described my invention, what I claim as new, and desire to secure by Letters Patent, is—

A harrow composed of a number of trihedral sections, each section having suitable teeth, the sides of the sections being curved.

In testimony whereof I affix my signature in presence of two witnesses.

GEORGE BUKOFSKY.

Witnesses:
   ADOLPH D. WEINER,
   LUDWIG ZEISLER.